United States Patent
Wallis

(10) Patent No.: US 6,856,525 B2
(45) Date of Patent: Feb. 15, 2005

(54) APPARATUS AND METHOD FOR CONTROLLING VOLTAGE REGULATOR AND POWER SUPPLY APPARATUS

(75) Inventor: Mark Wallis, Berkshire (GB)

(73) Assignee: NEC Corporation, Tokyo (JP)

(*) Notice: Subject to any disclaimer, the term of this patent is extended or adjusted under 35 U.S.C. 154(b) by 164 days.

(21) Appl. No.: 09/988,589

(22) Filed: Nov. 20, 2001

(65) Prior Publication Data

US 2002/0093318 A1 Jul. 18, 2002

(30) Foreign Application Priority Data

Nov. 22, 2000 (GB) ................................. 0028488

(51) Int. Cl.$^7$ ..................... H02M 3/18; G05F 1/10
(52) U.S. Cl. ..................... 363/59; 363/60; 327/536
(58) Field of Search ................... 323/274, 282, 323/313, 314, 271; 327/536, 537, 589, 538, 540; 363/59, 60, 56, 52; 307/109, 110

(56) References Cited

U.S. PATENT DOCUMENTS 5,889,428 A * 3/1999 Young ..................... 327/536
6,370,046 B1 * 4/2002 Nebrigic et al. ............ 363/60

* cited by examiner

*Primary Examiner*—Rajnikant B. Patel
(74) *Attorney, Agent, or Firm*—Young & Thompson

(57) ABSTRACT

In a method for controlling a voltage regulator, first and second charge storage devices are switchably connected between a voltage source and the voltage regulator. The first storage device is switched into connection with the voltage source until the voltage on it reaches a predetermined level. The first storage device is disconnected from the voltage source and switched into connection with the second storage device and the voltage regulator until the voltage input to the voltage regulator falls below a predetermined level. The above operations are repeated.

10 Claims, 3 Drawing Sheets

APPARATUS AND METHOD FOR CONTROLLING VOLTAGE REGULATOR AND POWER SUPPLY APPARATUS

BACKGROUND OF THE INVENTION

1. Field of the Invention

The present invention relates to an apparatus and method for controlling a linear voltage regulator.

2. Description of the Related Art

Linear voltage regulators are well known electronic devices. They are used to produce a steady output voltage at a predetermined level from an input voltage which may vary. The input voltage is higher than the output voltage and heat is dissipated in the regulator. The power dissipated given a constant load current is proportional to the voltage drop between the input and the output. For example, in a battery operated system where the operating voltage of the circuitry is significantly lower than the battery voltage, reducing the power dissipation in the regulator will lead to improved battery life. It will also reduce the thermal efficiency requirements of the regulator thereby allowing a small and cheaper package and pass transistor to be used. Conventionally, power supply efficiency has been improved by replacing the pass transistor with a switched inductor. A buck converter uses such an arrangement. However, the inductor tends to be a large and expensive component and is generally not suitable for miniaturization.

SUMMARY OF THE INVENTION

Therefore, an object of the present invention is to provide a method and circuitry for improving the efficiency of a linear regulator without using ferroelectric components.

Another object of the present invention is to reduce the input voltage to a linear regulator be switching small amounts of change between capacitors.

In an aspect of the present invention, a method for controlling a voltage regulator is achieved by a) providing first and second charge storage devices switchably connected between a voltage source and the voltage regulator; by b) switching the first storage device into connection with the voltage source until the voltage on it reaches a predetermined level; by c) disconnecting the first storage device from the voltage source and switching it into connection with the second storage device and the voltage regulator until the voltage input to the voltage regulator falls below a predetermined level; and by d) repeating steps b) and c).

Here, the storage devices may be capacitors connected in parallel with the voltage regulator, across the voltage source.

Also, the switching may be performed by two switches connected in series, one between the voltage source and the first storage device and the other between the first and second storage devices.

Also, the first storage device may be significantly larger than the second storage device.

In another aspect of the present invention, an apparatus for controlling a voltage regulator includes a voltage source, and a first and second charge storage devices connected between the voltage source and the voltage regulator. A section connects the first storage device to the voltage source and disconnects it from the second storage device and the voltage regulator until the voltage on the first storage device reaches a predetermined level. Another section disconnects the first storage device from the voltage source and connects it to the second storage device and the voltage regulator until the input voltage to the voltage regulator falls below a predetermined level. Still another section switches the storage devices between the 2 modes of operation.

Here, the storage devices may be capacitors, and the connecting section may include two switches are connected in series between the voltage source and the first storage device, the other between the two storage devices.

Also, it is preferable that the first storage device is substantially larger than the second storage device.

In still another aspect of the present invention, a power supply apparatus includes a power supply, a voltage regulator, and first and second capacitors provided between the power supply and the voltage regulator in parallel to the power supply. The apparatus further includes a first switch provided between the power supply and the first capacitor to open or close in response to a first control signal, and a second switch provided between the power supply and the second capacitor to open or close in response to a second control signal. A control circuit generates the first and second control signals to the first and second switches such that the second switch opens and then the first switch closes when a voltage of the second capacitor decreases to a first predetermined level, and such that the first switch opens and the second switch closes after a first predetermined time period from the closing the first switch.

Here, the first predetermined time may be a time period until a voltage of the first capacitor reaches a second predetermined level after the first switch is closed.

Also, the control circuit may generate the first and second control signals to repeat a switching operation in which the second switch opens and then the first switch closes when the voltage of the second capacitor decreases to the first predetermined level, and the first switch opens and the second switch closes after the first predetermined time period from the closing the first switch.

Also, the control circuit may monitor the voltage of the second capacitor and generates the first and second control signals based on the monitoring result.

Also, it is preferable that the second capacitor is larger in capacitance than the first capacitor.

In yet still another aspect of the present invention, a power supply apparatus includes a power supply, a voltage regulator, and first and second capacitors provided between the power supply and the voltage regulator in parallel to the power supply. The apparatus further includes a first switch provided between the power supply and the first capacitor to open or close in response to a first control signal, and a second switch provided between the power supply and the second capacitor to open or close in response to a second control signal. A control circuit generates the first and second control signals to the first and second switches such that the second switch opens and then the first switch closes when a voltage of the first capacitor decreases to a first predetermined level, and such that the first switch opens and the second switch closes after a first predetermined time period from the closing the first switch.

Here, the first predetermined time may be a time period until a voltage of the first capacitor reaches a second predetermined level after the first switch is closed.

Also, the control circuit may generate the first and second control signals to repeat a switching operation in which the second switch opens and then the first switch closes when the voltage of the first capacitor decreases to the first predetermined level, and the first switch opens and the second switch closes after the first predetermined time period from the closing the first switch.

Also, the control circuit may monitor the voltage of the first capacitor and generate the first and second control signals when the voltage of the first capacitor decreases to the first predetermined level.

Also, it is preferable that the second capacitor is larger in capacitance than the first capacitor.

Also, the control circuit may monitor the voltage of the first capacitor and an output voltage of the voltage regulator and generate the first and second control signals based on the voltage of the first capacitor to the output voltage of the voltage regulator.

BRIEF DESCRIPTION OF THE DRAWINGS

A preferred embodiment of the present invention will now be described in detail by way of example with reference to the accompanying drawings in which.

DESCRIPTION OF THE PREFERRED EMBODIMENTS

Figure 1:
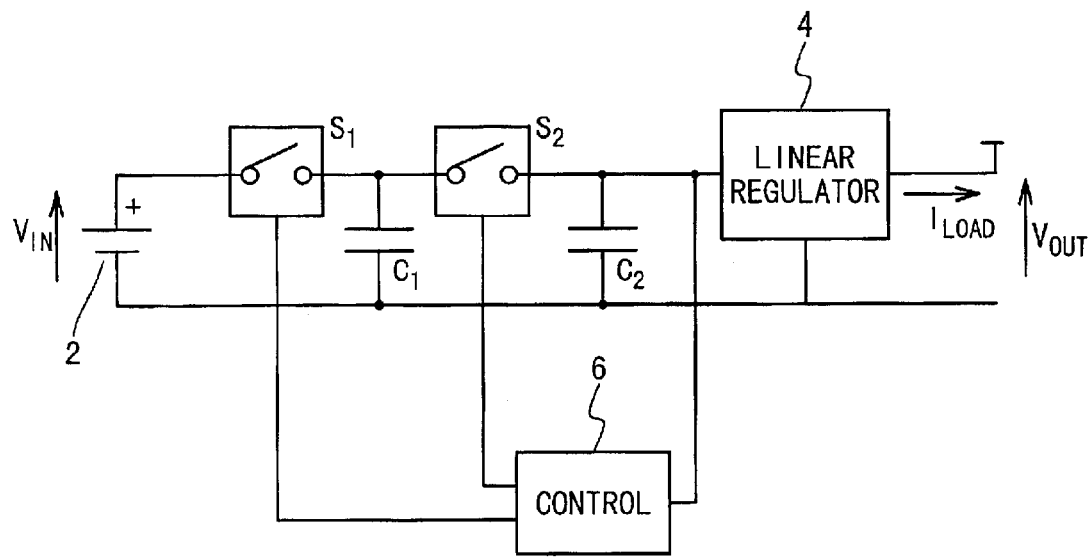
FIG. 1 is a block diagram of a system embodying the present invention.

A control apparatus of a linear regulator according to a first embodiment of the present invention is shown in FIG. 1. The control apparatus is comprised of a DC power supply or battery 2 which supplies an input voltage $V_{in}$. The power supply is connected in parallel with two capacitors $C_1$ and $C_2$. The capacitor $C_1$ is separated from the voltage $V_{in}$ by a switch $S_1$. A further switch $S_2$ separates the capacitors $C_1$ and $C_2$. A linear regulator 4 is connected across the circuit downstream of the capacitor $C_2$ and has an output which produces a voltage $V_{out}$ and a current $I_{load}$.

A control circuit 6 monitors the input voltage $V_{in}$ to the linear regulator 4 and in response to the monitoring result, supplies control signals to the switches $S_1$ and $S_2$ which can be closed. The switch $S_1$ when closed will enable the capacitor $C_1$ to charge. The switch $S_2$ when closed will allow the capacitor $C_2$ to charge from the capacitor $C_1$ at the same time as providing input charge to the linear regulator 4.

The control circuit 6 is responsive to the voltage of the input to the linear regulator 4. When this voltage falls below a predetermined level, corresponding to the minimum required to maintain the output voltage $V_{out}$, the control circuit 6 opens the switch $S_2$ and closes the switch $S_1$, in that order. This causes the capacitor $C_1$ to be charged up to the battery voltage, whereupon the switch $S_1$ is reopened and the switch $S_2$ is closed (again in that order). A charge is transferred from the battery to the capacitor $C_1$ in the first stage where the switch $S_1$ is closed and in the second stage when the switch $S_1$ is opened and the switch $S_2$ is closed, the charge is transferred from the capacitor $C_1$ to the capacitor $C_2$ until the voltages across the capacitors are equalized. Subsequently, if a constant load current $I^{load}$ is drawn from the regulator 4, the voltage on the capacitors $C_1$ and $C_2$ will decrease linearly until the switching threshold is reached again. Typically, the switching threshold will be set to such a level that recharging the capacitor $C_1$ by closing the switch $S_1$ and opening the switch $S_2$, and switching back to discharge of the capacitor $C_1$ by opening the switch $S_1$ and closing the switch $S_2$ can happen before the input voltage to the linear regulator 4 falls beneath the minimum required to maintain voltage $V_{out}$.

Figure 2:
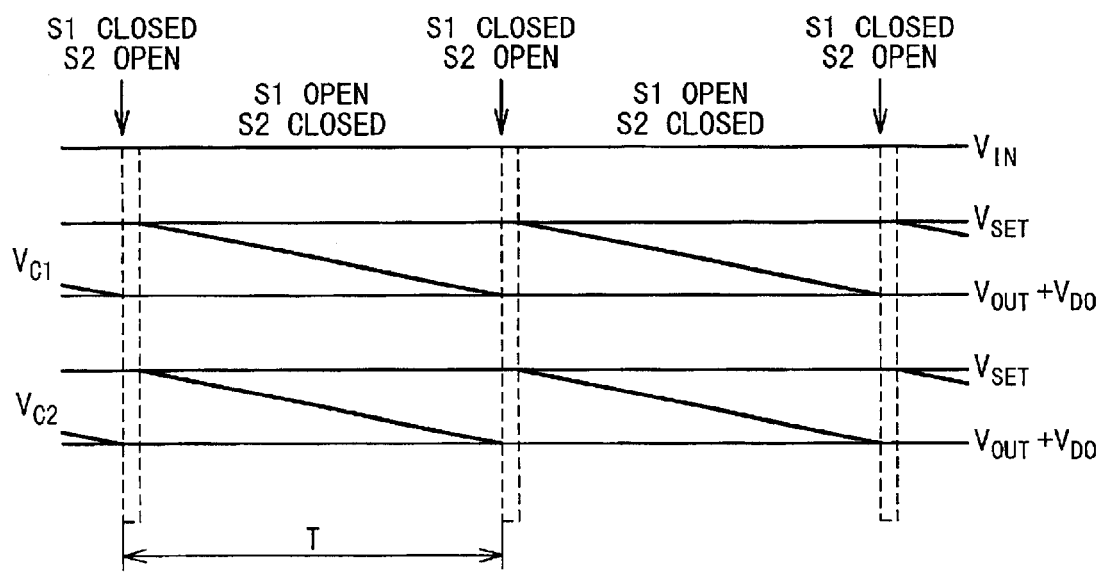
FIG. 2 shows the capacitor voltages for various states of the circuit FIG. 1.

The traces in FIG. 2 show the voltage across the capacitors linked to the switching cycle, assuming that there are no resistive losses in the circuit. In practice, there will of course be resistive losses and the traces will be modified accordingly.

The average voltage at the input to the regulator 4 is the average of $V_{C2}$, and is given by:

$$V_{ave} = \frac{V_{set} + V_{out} + V_{do}}{2} \quad (1)$$

A voltage $V_{set}$ is determined by considering the energy transferred between the capacitors. The energy stored in the capacitor $C_1$ while the switch $S_1$ is closed is given by:

$$E_1 = \frac{C_1 \cdot V_{in}^2}{2} \quad (2)$$

The energy remaining in the capacitor $C_2$ at the moment the switch $S_2$ closes is given by:

$$E_2 = \frac{C_1 \cdot (V_{out} + V_{do})^2}{2} \quad (3)$$

By conservation of energy, the combined energy of the capacitors $C_1$ and $C_2$ in parallel is given by:

$$E_c = E_1 + E_2 = \frac{C_1 \cdot V_{in}^2}{2} + \frac{C_2 \cdot (V_{out} + V_{do})^2}{2} \quad (4)$$

Also:

$$E_c = \frac{(C_1 + C_2) \cdot V_{set}^2}{2} \quad (5)$$

Therefore:

$$V_{set} = \sqrt{\frac{2 \cdot E_c}{C_1 + C_2}} = \sqrt{\frac{C_1 \cdot V_{in}^2 + C_2(V_{out} + V_{do})^2}{C_1 + C_2}} \quad (6)$$

From the above equations, it can be deducted that the power drawn from the battery 2 is given by:

$$P = I_{load} \cdot V_{set} = \frac{I_{load}}{2} \cdot \left[ \sqrt{\frac{C_1 \cdot V_{in}^2 + C_2(V_{out} + V_{do})^2}{C_1 + C_2}} + V_{out} + V_{do} \right] \quad (7)$$

The power drawn from the battery 2 without the switch/capacitor circuit is given by:

$$P_{old} = I_{load} \cdot V_{in} \quad (8)$$

Therefore, the improvement in power efficiency given by the circuit (ignoring power lost during the switching due to gate capacitance and switch/capacitor series resistance) is:

$$\frac{P}{P_{old}} = \frac{1}{2 \cdot V_{in}} \cdot \left[ \sqrt{\frac{C_1 \cdot V_{in}^2 + C_2(V_{out} + V_{do})^2}{C_1 + C_2}} + V_{out} + V_{do} \right] \quad (9)$$

It can be seen by examination of equation (1) that the best efficiency is obtained when $C_2 >> C_1$ such that $V_{set} => (V_{out} + V_{do})$. Then the improvement in efficiency approaches the ratio:

$$\frac{P}{P_{old}} = \frac{V_{out} + V_{do}}{V_{in}} \quad (10)$$

The period T between successive activations of the switches is dependent on the load current:

$$T = \frac{[V_{set} - (V_{out} + V_{do})] \cdot (C_1 + C_2)}{I_{load}} \quad (11)$$

or substituting for $V_{set}$:

$$T = \frac{(C_1 + C_2)}{I_{load}} \left[ \sqrt{\frac{C_1 \cdot V_{in}^2 + C_2(V_{out} + V_{do})^2}{C_1 + C_2}} - (V_{out} + V_{do}) \right] \quad (12)$$

So the switching period is inversely proportional to the load current, as would be expected. The period can be increased (to save power lost in switching) by making the capacitor $C_1$ as large as possible.

Figure 3:
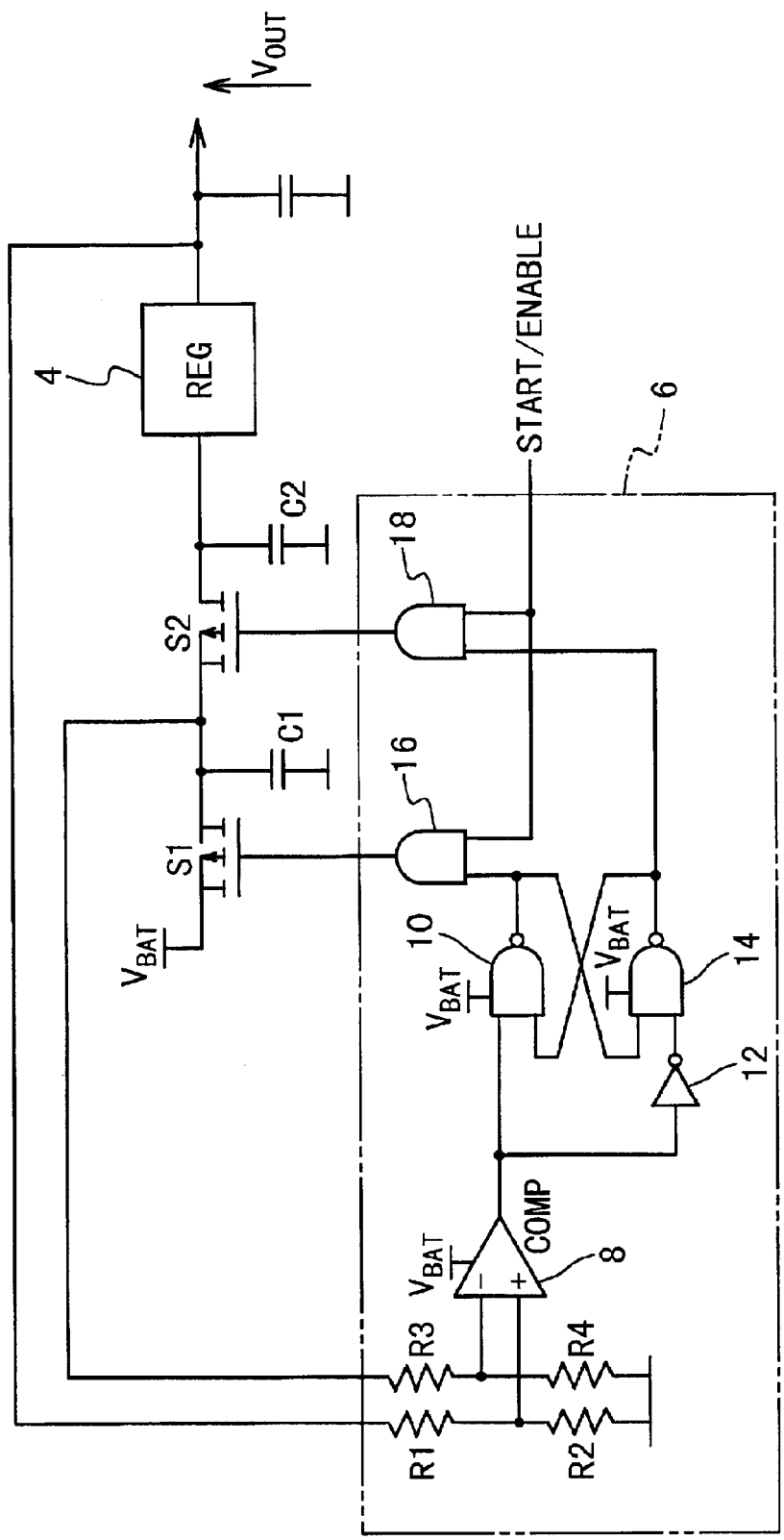
FIG. 3 shows an implementation of a second embodiment of the control circuitry of FIG. 1.

FIG. 3 shows the control apparatus of the regulator according to the second embodiment of the present invention. The portion of the circuit corresponding to the control circuit 6 of FIG. 1 is shown in dotted outline. The switches $S_1$ and $S_2$ are P-channel FET devices. The feedback arrangement of the voltage which in FIG. 1 is from the input voltage to the linear regulator (given by the voltage on the capacitor $C_2$) is in the embodiment replaced by feedback from the voltage on the capacitor $C_1$ and from the voltage output of the regulator 4 for $V_{out}$. The output voltage $V_{out}$ is the voltage input to a voltage divider $R_1$ and $R_2$ and the output of this divider is provided to one input of a comparator 8. The voltage on the capacitor $C_1$ is fed by a further voltage divider $R_3$ and $R_4$ to the other inverted input of a comparator 8. The comparator has a hysteresis characteristic and outputs a pulse with a predetermined duration time when the output of the voltage divider $R_3$ and $R_4$ is lower than that of the voltage divider $R_1$ and $R_2$. The pulse duration time is sufficient to charge the capacitor $C_1$ to the power supply voltage.

The output of the comparator 8 is provided to the two inputs of a flip-flop comprising a pair of NAND gates and a pair of AND gates. The output of the comparator 8 goes directly to the input of a first NAND gate 10 and by the inverter 12 to the second NAND gate 14. The output of the second NAND gate 14 is connected to the other input of the first NAND gate 10, and the output of the first NAND gate 10 is connected to the second input of the second NAND gate 14. The output of the first NAND gate 10 is also connected to an input of an AND gate 16 whilst the output of the second NAND gate 14 is connected to an input of an AND gate 18. The other input of each of these AND gates 16 and 18 is connected to a start/enable line. The purpose of the AND gates is to enable the regulator 4 to start up.

Figure 4:
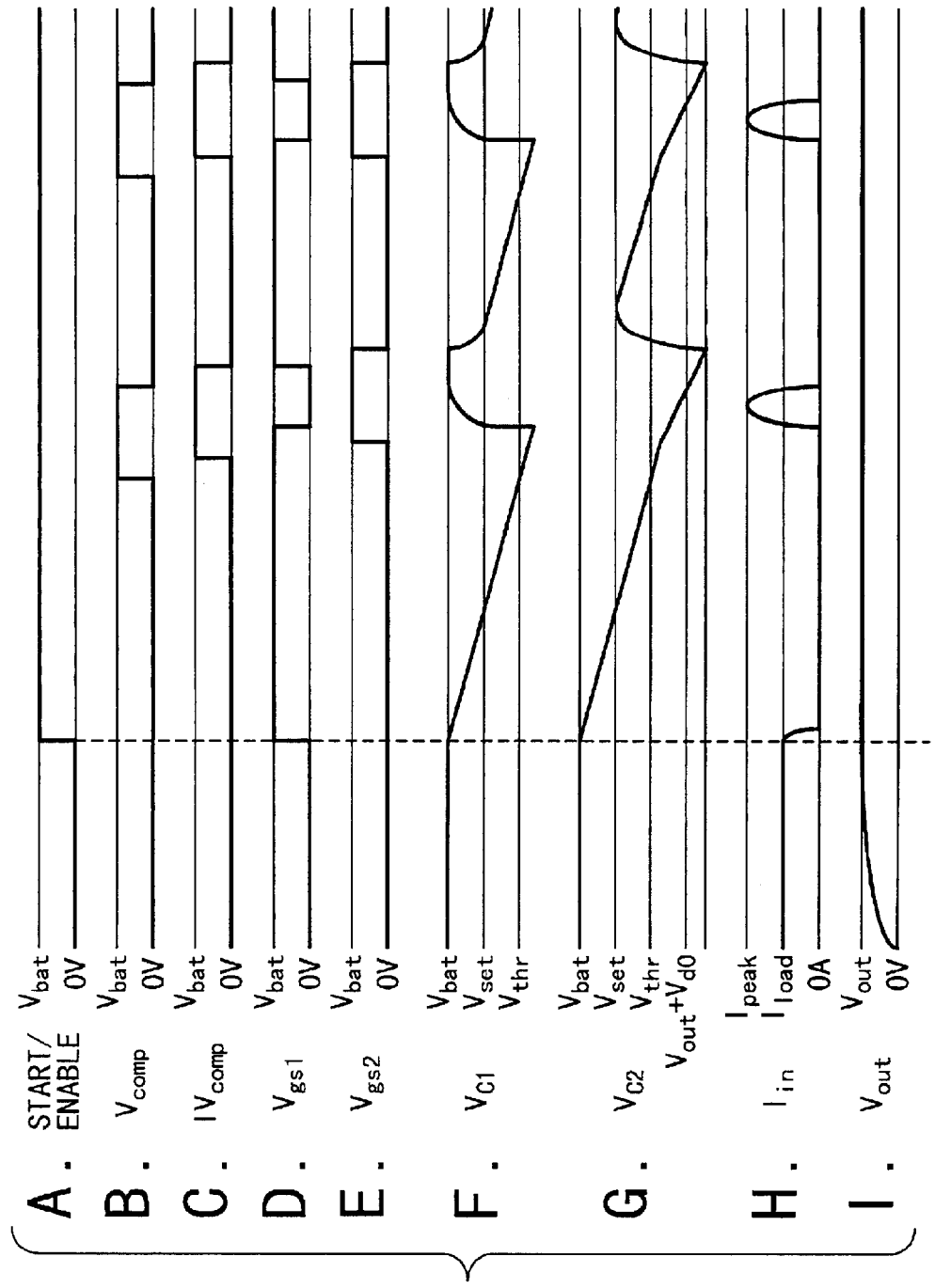
FIG. 4 shows the voltage signal transitions for various points in the circuit of FIG. 3.

FIG. 4 shows the voltage at various points in the circuit during start up and subsequent operation following the application of a signal to the start/enable line.

When the start/enable signal is low (probably by default when the battery 2 power $V_{bat}$ is applied) as shown in FIG. 4A, both FET switches $S_1$ and $S_2$ are forced on, and the battery 2 voltage is applied directly to the regulator 4 input. This enables the regulator 4 to start up as normal in a low efficiency mode. This mode may also be used if the battery voltage falls to the point where the control apparatus ceases to provide any efficiency improvement or, alternatively, may be used in situations where harmonic interference caused by switching is undesirable (e.g., in a radio subsystem).

When the start/enable signal is set high as shown in FIG. 4A, e.g., by a micro-controller I/O port, the voltage on the capacitor $C_1$ will be higher than output of the regulator 4 and the output of the comparator 8 will be low as shown in FIG. 4B. Therefore, the voltage $V_{gs1}$ (the $S_1$ enabling voltage) will be high as shown in FIG. 4D, and so the switch $S_1$ will be open, and the voltage $V_{gs2}$ ($S_2$ enabling voltage) will be low as shown in FIG. 4E, which means the switch $S_2$ will be closed. If a load current is drawn from the regulator 4, the voltage on the capacitors $C_1$ and $C_2$ will fall as shown in FIGS. 4F and 4G. When the voltage $V_{c1}$ reaches a predetermined switching point, $V_{threshold}$ ($V_{thr}$ in FIG. 4), the comparator 8 output will go high as shown in FIG. 4B. The switching point is set relative to the output voltage $V_{out}$ of the regulator 4, and can be adjusted by varying the ratio of $R_3$ to $R_4$. It should be chosen such that the voltage across the regulator 4 remains larger than the maximum dropout voltage $V_{do}$ (the voltage drop across the regulator 4) at all times and under all load current conditions. Clearly, allowance needs to be made for the time taken to recharge the capacitor $C_1$, considering that in a practical implementation there will be a finite switching time for the FET's, and series resistance means that the capacitors do not charge instantaneously.

When the comparator 8 output switches to high in response to a reduction in the capacitor voltage $V_{c1}$ or the output voltage $V_{out}$, the flip-flop will cause the voltage $V_{gs2}$ to go high as shown in FIG. 4E. Thereby, the switch $S_2$ is opened. Also, the flip-flop will cause the voltage $V_{gs1}$ to go low as shown in FIG. 4D, thereby closing the switch $S_1$. The capacitor $C_1$ will then be charged and the voltage $V_{c1}$ will increase as shown in FIG. 4F. This will cause the comparator 8 output to go low as shown in FIG. 4B when the voltage $V_{c1}$ reaches a predetermined level. At this time, the switch $S_1$ is opened again as shown in FIG. 4D and the switch $S_2$ is closed as shown in FIG. 4E. Then, the cycle begins again.

The small amount of resistance in the switching circuit which was mentioned above consists of the series resistance of the battery, or voltage source, the series resistance of the switches and interconnections, and the series resistance of the capacitors. The effect of this is twofold. Firstly, it will reduce the efficiency of the circuit due to energy dissipation. Secondly, it will introduce a delay of the transfer of charge between the battery 2 and the capacitors $C_1$ and $C_2$. Any inductance in the circuit will also add to this delay. This means that the "on" time of the switch $S_1$ must be increased to allow the capacitor $C_1$ to be fully charged.

The circuit shown in FIG. 3 relies on propagation delays through the feedback circuitry to provide this delay. A more deterministic method might include a hysteresis component in the comparator, such that the voltage on $C_1$ has to approach the battery voltage before the comparator switches back.

A second consideration is the time required to turn the transistor on and off. This is determined by the size of the transistor, the gate capacitance, and the drive capability of the AND gates. Clearly, if there is a period during which both transistors are switched on, the capacitor $C_2$ will be directly charged from the battery 2, and the voltage of the regulator 4 input will be consequently higher. This leads to a reduction in efficiency of the circuit which can be dramatic. The NAND/inverter circuit is used to prevent any overlap between switching off one transistor and switching on the other. Nevertheless, this relies on the propagation delay through the NAND gates being greater than the switching time of the transistors FET1 and FET2. The delay can be increased by inserting extra delay buffers in the feedback path between the output of one NAND gate and the input of the other.

Another effect of the transistor switching time increases loss whilst the transistors are partially on and, hence resistive. Ideally, vary fast transistors should be used. However, this can usually only be achieved at the expense of series resistance and/or maximum current capability. Therefore, a compromise must be made based on the load requirements. Furthermore, it should be noted that the peak current flow from the battery $I_{peak}$ can be high if the switch $S_1$ switches very quickly. A slower turn on time may be desirable to limit the transient current and possible associated noise problems.

The most obvious practical consideration is in the selection of the capacitors. Clearly, low ESR dielectrics such as ceramics will contribute less to the overall loss in the switching system. However, the larger the value of the capacitor $C_1$ becomes, the lower the switching frequency becomes, (furthermore, the capacitor $C_2$ should be significantly larger than the capacitor $C_1$) and this will increase efficiency. This is because a significant amount of power is lost in the switching of the gates and the transistors and therefore a low switching frequency is desirable. Preferably, therefore, the capacitor $C_2$ should be chosen to be as large as possible within the space and cost limitations of the system.

The switching transistors and feedback circuit could be integrated into a BiCMOS process with the linear regulator Bipolar/CMOS (CMOS: Complementary Metal Oxide Semiconductor). This would mean that the only external components required would be the capacitors. All linear regulators do in fact require an input and an output capacitor for stability and smoothing and, therefore, in fact only one extra capacitor $C_1$ would be required. The system therefore offers considerable efficiency gains over a standard linear regulator through the addition of one extra capacitor. The system also offers advantages over ferro-electric switch mode converters such as buck regulators. Capacitors are generally cheaper, smaller, have lower series resistance and radiate less than inductors and transformers. All of these are qualities which are of particular importance for portable telecommunications systems.

Where higher current applications are required, it is necessary to use tantalum or electrolytic capacitors. Large transistors are also required for low resistance in high current applications.

Interference due to high peak charge currents may occur, and the switching frequency is not predictable, this being dependent on the load current. This can easily be overcome by using a fixed frequency clock, rather than a comparator to drive the switches. This arrangement, however, would be less efficient at low loads.

What is claimed is:

1. A power supply apparatus comprising:
    a power supply;
    a voltage regulator;
    first and second non-ferroelectric capacitors provided between said power supply and said voltage regulator in parallel to said power supply;
    a first switch provided between said power supply and said first capacitor to open or close in response to a first control signal;
    a second switch provided between said power supply and said second capacitor to open or close in response to a second control signal; and
    a control circuit which generates said first and second control signals to said first and second switches such that said second switch opens and then said first switch closes when a voltage of one of said first and second capacitors decreases to a first predetermined level, and such that said first switch opens and said second switch closes after a first predetermined time period from the closing said first switch,
    wherein the voltage regulator outputs a voltage, and
    wherein the control circuit comprises:
        a comparator; and
        a flip-flop connected to an output of said comparator.

2. The power supply apparatus according to claim 1, wherein said first predetermined time is a time period until a voltage of said first capacitor reaches a second predetermined level after said first switch is closed.

3. The power supply apparatus according to claim 1, wherein said control circuit generates said first and second control signals to repeat a switching operation in which said second switch opens and then said first switch closes when the voltage of said second capacitor decreases to said first predetermined level, and said first switch opens and said second switch closes after said first predetermined time period from the closing said first switch.

4. The power supply apparatus according to claim 1, wherein said control circuit monitors the voltage of said second capacitor and generates said first and second control signals based on the monitoring result.

5. The power supply apparatus according to claim 1, wherein said second capacitor is larger in capacitance than said first capacitor.

6. The power supply apparatus as claimed in claim 1, wherein the flip-flop comprises a pair of NAND gates and a pair of AND gates.

7. The power supply apparatus as claimed in claim 6, further comprising an inverter,
    wherein an output of the comparator goes directly to an input of a first one of said pair of NAND gates, and said output of the comparator is connected to a second one of said pair of AND gates through said inverter.

8. The power supply apparatus according to claim 7, wherein an output of said second NAND gate is connected to a second input of said first NAND gate and the output of said first NAND gate is connected to a second input of said second NAND gate.

9. The power supply apparatus according to claim 8, wherein the output of the first NAND gate is connected to an input of a first AND gate and the output of said second NAND gate is connected to an input of a second AND gate, and
    wherein the control circuit further comprises a START/ENABLE line, a second input of each of said pair of AND gates being connected to said START/ENABLE line.

10. The power supply apparatus as claimed in claim 9, wherein said first AND gate is connected to said first switch and said second AND gate is connected to said second switch so that when the voltage of one of said first and second capacitors decreases to said first predetermined level, said second switch opens and then said first switch closes.

* * * * *